GEORGE J. HARRIS.
Device for Moistening the Legs of Horses.
No. 127,875. Patented June 11, 1872.
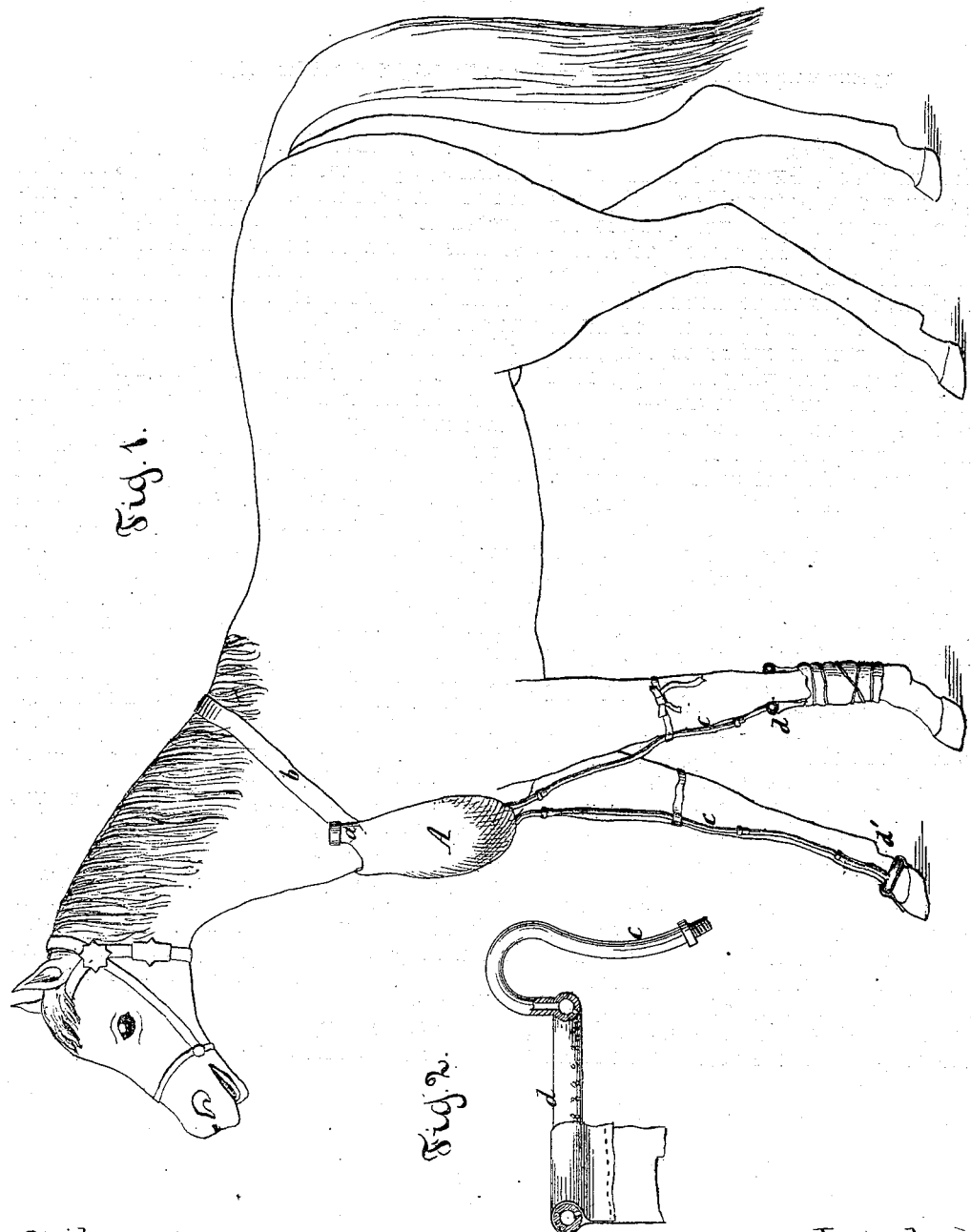

127,875

UNITED STATES PATENT OFFICE.

GEORGE J. HARRIS, OF NEW YORK, N. Y.

IMPROVEMENT IN DEVICES FOR MOISTENING THE LEGS OF HORSES.

Specification forming part of Letters Patent No. 127,875, dated June 11, 1872.

*To all whom it may concern:*

Be it known that I, GEORGE J. HARRIS, of the city, county, and State of New York, have invented a new and Improved Device for Moistening the Legs of Horses and other Animals; and I do hereby declare the following to be a full, clear, and exact description thereof, which will enable those skilled in the art to make and use the same, reference being had to the accompanying drawing forming part of this specification, in which drawing—

Figure 1 represents a perspective view of my invention as applied to a horse. Fig. 2 is sectional side view of one of my tubular sprinklers, on a larger scale than the previous figure.

Similar letters indicate corresponding parts.

This invention consists in a water-bag or reservoir, provided with a neck-band or suspending-strap, and with water-discharge pipes which connect with tubular sprinklers made to be attached to different parts of the legs of a horse or other animal, in such a manner that when the water-bag is supplied with water and suspended from the neck of a horse or other animal, and the tubular sprinklers are adjusted in the required positions, the legs and feet of the animal are kept moist for a long time without requiring any attention.

In the drawing, the letter A designates a bag or reservoir, which I make, by preference, of India-rubber cloth, or other water-proof fabric, but which may be made of any suitable material, and which is provided with a feed-opening or spout, $a$, and with a strap, $b$, which latter serves to suspend the same from the neck of a horse or other animal, as shown in the drawing. From the bottom part of the reservoir A extend a series of pipes, $c$, (in practice, I propose to have one pipe for each leg of the animal,) and these pipes are connected to tubular sprinklers, $d$ $d'$, which are so constructed that they can be conveniently secured to the legs of a horse or other animal, either below the knee or below the ankle-joint, as shown in Fig. 1. These sprinklers are provided with a large number of small holes, and they are enveloped in flannel or other suitable absorbent material, so that the water, which oozes out slowly through the holes in the tubular sprinklers, is distributed over the entire surface of the legs or feet of the animal. The feet may also be wrapped with flannel, which, being soaked with the water discharging from the sprinklers, serves to keep the legs moist.

By these means I am enabled to supply a quantity of liquid requisite to keep the legs and feet of a horse or other animal moist for a long time, and after my device is once adjusted in the proper position, it requires no further attention until the reservoir is empty.

The practical value and the great convenience of my moistening device will be readily appreciated by horsemen.

What I claim as new, and desire to secure by Letters Patent, is—

The reservoir A, adapted to be suspended by a strap, $b$, upon the neck of a horse, and provided with discharge-tubes $c$ $c$, with or without the sprinklers $d$ $d'$, all constructed and arranged as herein shown and described.

GEORGE J. HARRIS.

Witnesses:
W. HAUFF,
JNO. D. PATTEN.